United States Patent [19]

Tate

[11] Patent Number: 5,316,149

[45] Date of Patent: May 31, 1994

[54] REUSABLE BAG FOR PACKAGING ARTICLES

[75] Inventor: David J. Tate, Cumbria, England

[73] Assignee: Lilliput Lane Limited, Cumbria, United Kingdom

[21] Appl. No.: 661,239

[22] Filed: Feb. 27, 1991

[30] Foreign Application Priority Data

Jun. 5, 1990 [GB] United Kingdom ............... 9012521

[51] Int. Cl.⁵ ..................... B65D 81/02; B65D 85/30
[52] U.S. Cl. .................................. 206/584; 383/102; 410/117; 53/472
[58] Field of Search ..................... 206/584; 383/102; 410/117; 53/472

[56] References Cited

U.S. PATENT DOCUMENTS

| | | |
|---|---|---|
| 3,304,219 | 2/1967 | Nickerson .................. 206/584 X |
| 3,462,007 | 8/1969 | Heider et al. ................ 53/450 X |
| 3,503,177 | 3/1970 | Kropscott et al. . | 
| 3,999,653 | 12/1976 | Haigh et al. ................ 383/102 X |
| 4,011,611 | 3/1977 | Lederman .................... 5/361 B |
| 4,162,696 | 7/1979 | Sprung ...................... 206/584 X |
| 4,566,831 | 1/1986 | Groth ........................ 410/117 |
| 4,620,633 | 11/1986 | Lookholder ................. 53/472 X |
| 4,880,119 | 11/1989 | Simon . | |
| 4,999,975 | 3/1991 | Willden et al. .............. 53/472 X |

FOREIGN PATENT DOCUMENTS

| | | | |
|---|---|---|---|
| 2616291 | 11/1977 | Fed. Rep. of Germany | 128/90 |
| 020559 | 5/1984 | Japan | 206/584 |
| 838205 | 6/1960 | United Kingdom . | |
| 2186864 | 11/1987 | United Kingdom . | |

*Primary Examiner*—William I. Price
*Attorney, Agent, or Firm*—Cushman, Darby & Cushman

[57] ABSTRACT

A reusable packaging bag for fitting around an article and a method of using the reusable packaging bag. The packaging bag comprises an air-porous plastic bag which contains a plurality of plastic particles of different sizes. One or more of these packaging bags are fitted inside a container and around the article to be packaged. When the lid of the container is closed, some of the air inside the packaging bags escapes thereby allowing the plastic particles to be fitted together in a substantially rigid body which molds to the shape of the article between the interior of the closed container and the article.

12 Claims, 1 Drawing Sheet

REUSABLE BAG FOR PACKAGING ARTICLES

BACKGROUND OF THE INVENTION

This invention concerns packaging and is particularly concerned with packaging for relatively heavy but fragile articles.

Packaging of relatively heavy but fragile articles, such as plaster of paris models and figures, currently involves use of foam rubber and other materials to cushion articles and/or specially shaped polyurethane foam formers. The former are not entirely satisfactory for a heavy article as they do not prevent an article from moving around inside a box or carton. The latter do prevent movement of an article but are relatively expensive to produce and can only be used for the one article.

An object of this invention is to provide packaging for an article, whereby the article can be transported safely, which packaging may be reusable.

According to this invention there is provided packaging for an article to be transported comprising at least one air permeable bag containing particles, especially beads, of a light but relatively rigid material, such as blown or expanded polymer beads, especially polystyrene.

The air permeable bag is preferably made of a plastic material that is microporous. Preferred plastic materials for the bags are of relatively high tear strength, such as polyethylene or polypropylene. The plastic material used for the bags is preferably also an antistatic plastic material. Microporosity may be achieved by perforating or punctuating the plastics material prior to forming a bag or during production and filling of a bag.

For the sake of appearance, the plastic bags are preferably painted or coated with an opaque pigmented finish to give the appearance of satin.

The bags used in the invention will preferably be formed by heat sealing along edges of the overlaid plastic material to form an open ended bag which is then filled with the particles prior to complete edge sealing. Two separate sheets or one folded sheet of plastic material may be used for that purpose. The bags may also be formed from a tubular plastic material cut into suitable lengths, sealed at one end prior to filling and sealed at the other end after filling.

The bags used in the invention may alternatively be of a textile material, such as satin or nylon, and produced by sewing textile pieces together at overlaid edges thereof.

The particles used in the bags of the invention are preferably of different sizes to enable closer packing thereof when air is evacuated from the enclosing bag. Preferably particles in the size range 3-5 millimeters are used for the filling. The preferred particles or beads have a high compressive strength.

The amount of filling in a bag will preferably be chosen so that the bag is sufficiently flexible to allow it to be fitted around an object but also so that air evacuation on compression will produce a generally rigid body, as air is forced out of the bag.

In use, an object to be packaged will be surrounded in a container, such as a cardboard carton or box, by one or more bags of the invention. The weight of the object and pressure exerted on the bags by closing of the container lid will cause air to be evacuated through the microporous walls of the bag. The particles within the bags are thus forced together to form a substantially rigid body molded to the shape of the object being packaged. The bags then do not permit much, if any, movement of the object within the container but the particles themselves are generally able to absorb shocks and point loadings.

Once the container is opened, pressure is released and air can return to the bags, so that they become flexible again. Provided the bags have not been damaged they can be re-used.

BRIEF DESCRIPTION OF THE DRAWINGS

This invention will be further described, by way of example only, with reference to the accompanying drawings, in which.

DETAILED DESCRIPTION OF THE PREFERRED EMBODIMENT

Figure 1:
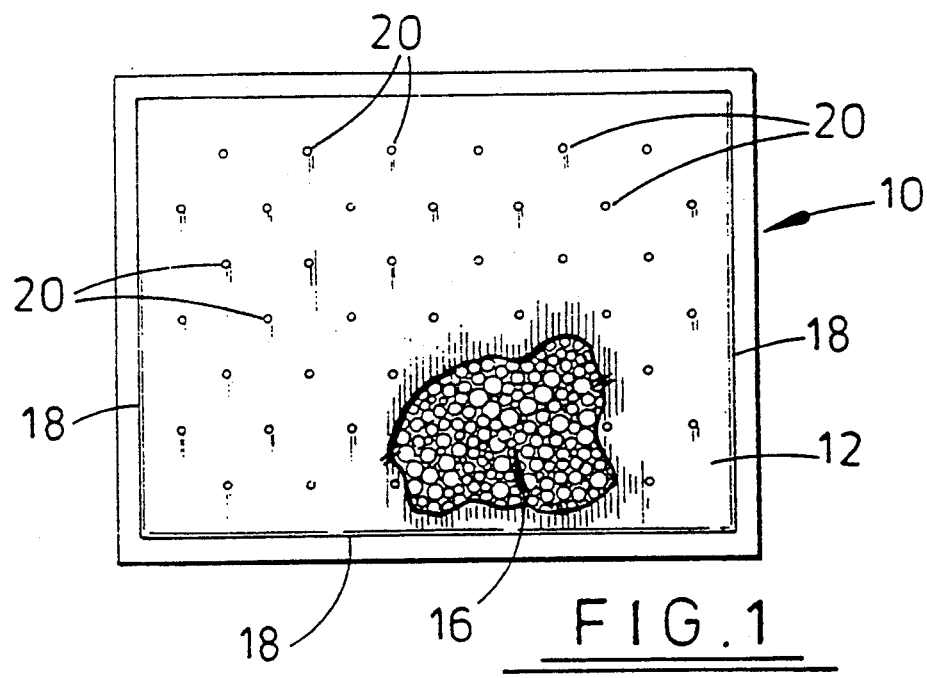
FIG. 1 shows a packaging according to the present invention.

Referring to FIG. 1 of the accompanying drawings, a packaging bag 10 comprises a plastic envelope 12 of high tear strength polyethylene or polypropylene, preferably treated to be antistatic and a filling of blown polystyrene beads 16 of high compressive strength. The envelope 12 is formed by heat sealing edges 18 of overlaid plastic sheets to form a pocket having an open end which is then filled with the beads 16 before heat sealing the open end to seal the envelope.

The plastic sheet material of the bag has a plurality of perforations 20 which are formed in the plastics material prior to forming the bag or one formed during the making of the bag.

The plastics material of the bags is painted on its intended outer surface with an opaque pigment to give, for example, an attractive satin-like finish.

The amount of filling for the bag is such that when not in use the filling is generally loose so that the bag can be molded to fit around an object. However, when air is evacuated from the bag when pressure is applied thereto by an object, the filling should form a fairly rigid body. The polystyrene beads used for the filling have particle sizes in the range of 3-5 millimeters. Ideally a mix of sizes of beads is used for the filling. Then a more compact body may be achieved as smaller beads will fill spaces between larger beads. FIG. 1 is a cross-sectional view of the packaging bag showing the bead content of the bag.

The size of beads used for filling the bags may also be chosen with consideration for the object to be packaged. Thus, for a smaller object, with relative small areas of detail to be protected, bags containing generally smaller beads may be used. Conversely for larger objects, bags containing larger beads may be used.

Figures 2, 3:
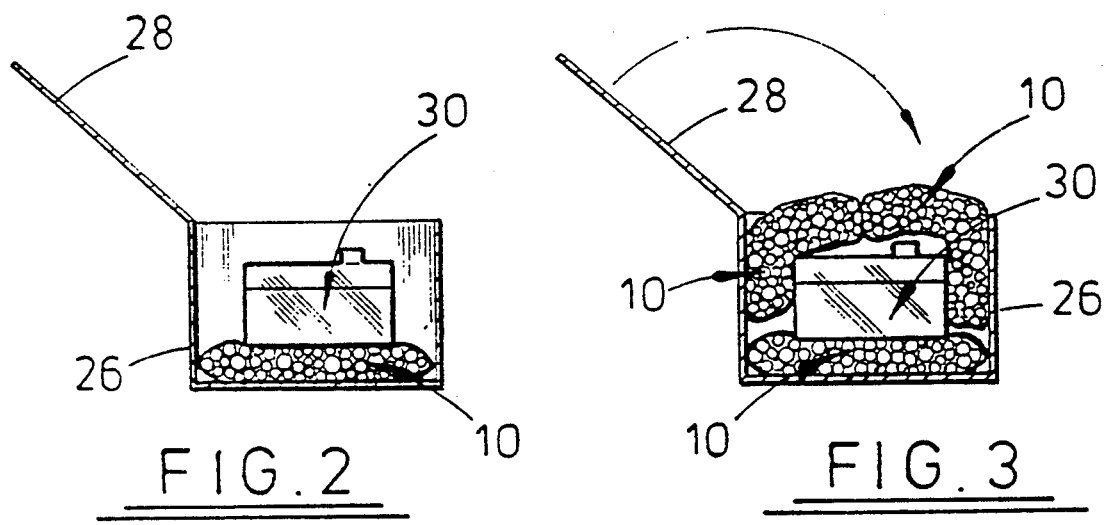
FIGS. 2, 3 and 4 show stages of packaging an article in a box using bags of the type shown in FIGS. 1a and 1b.
Figure 4:
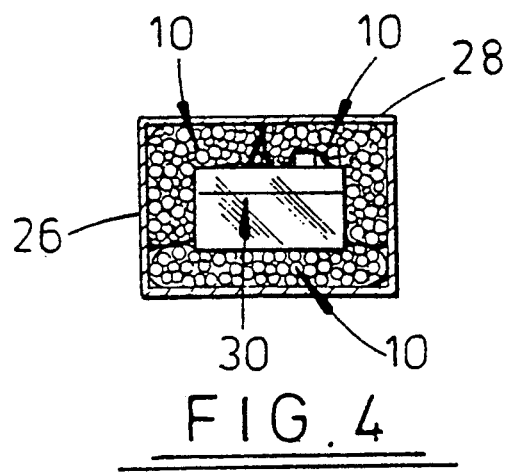

Turning now to FIGS. 2, 3 and 4 of the accompanying drawings, the packaging steps using bags of the FIG. 1 type are shown. In FIG. 2 a bag 10 is first laid in the bottom of a box 26 having a lid 28. An object 30 to be packaged, such as a plaster model of a cottage, are placed on the bag 10. Further bags 10, as necessary, are placed over and around the object 30 so that it is substantially surrounded as shown in FIG. 3. At this stage the bags 10 are still substantially loose and flexible.

Then, as shown in FIG. 4, the lid of the box is closed. That action puts pressure onto the bags 10 so that air contained therein is evacuated via their perforations 20.

The beads are thus forced together to form a rigid structure molded generally to the shape of the object 30. Of course, when the box is opened air returns to the bags, so that they once again become loose and flexible and can be reused.

The packaging system illustrated does not permit the object 30 to move about during transportation yet the filling of the bags being of high compressive strength is capable of taking point loadings from sharp or angular objects without affecting the object 30.

The number and size of packaging bags and the bead size of their fillings may be chosen according to the size and shape of the object to be transported and, except in cases of bags rupturing, the bags may be re-used as often as desired.

I claim:

1. A reusable packaging bag for fitting around an article, comprising:
    a plastic bag containing a plurality of plastic particles, some of the particles having a smaller size than other of the particles, the plastic gag being air-permeable so that forcing the packaging bag against the article causes air to escape from the particles and the larger size particles to fit together to form a substantially rigid body against the article, said plastic bag being made of an anti-static material.

2. The reusable packaging bag of claim 1 wherein the plastic bag is made of a material of relatively high tear strength selected from the group consisting of polyethylene and polypropylene.

3. The reusable packaging bag of claim 1 wherein the particles have diameters within the range of 3-5 millimeters.

4. The reusable packaging bag of claim 1 wherein the plastic bag contains perforations through which air can pass.

5. The reusable packaging bag of claim 1 wherein the plastic bag has an opaque finish.

6. The reusable packaging bag of claim 5 wherein the finish has the appearance of satin.

7. The reusable packaging bag of claim 1 wherein the plastic bag is comprised of a piece of tubular plastic material which is sealed at both ends.

8. The reusable packaging bag of claim 1 wherein the plastic bag is comprised of two separate sheets, the edges of the two sheets being sealed together to form the bag.

9. The reusable packaging bag of claim 1 wherein the plastic bag is comprised of one sheet which is folded over upon itself, the edges of the folded sheet being sealed together to form the bag.

10. A method of packaging an article in a container with at least one packaging bag, said at least one packaging bag comprising an air-permeable plastic bag containing multiple plastic particles, some of the particles having a smaller size than other of the particles, the method comprising the steps of:
    fitting said at least one packaging bag around the article, the article being inside said container when the container is open, after said fitting the volume occupied by the article and packaging bag being greater than the volume of the interior of the container when the container is closed; and
    forcing air from the packaging bag and causing the smaller size particles and the larger size particles to fit together to form a substantially rigid body between the interior of the closed container and the article.

11. The method of claim 10 wherein the step of forcing air from the packaging bag is performed when a lid of the container closes the container.

12. The method of claim 10 wherein the particles have diameters within the range of 3-5 millimeters.

* * * * *